Nov. 30, 1937. R. DE MEY 2,100,946
SUSPENSION ARRANGEMENT FOR SCREW FAN ROTORS
Filed Aug. 2, 1935 2 Sheets-Sheet 2
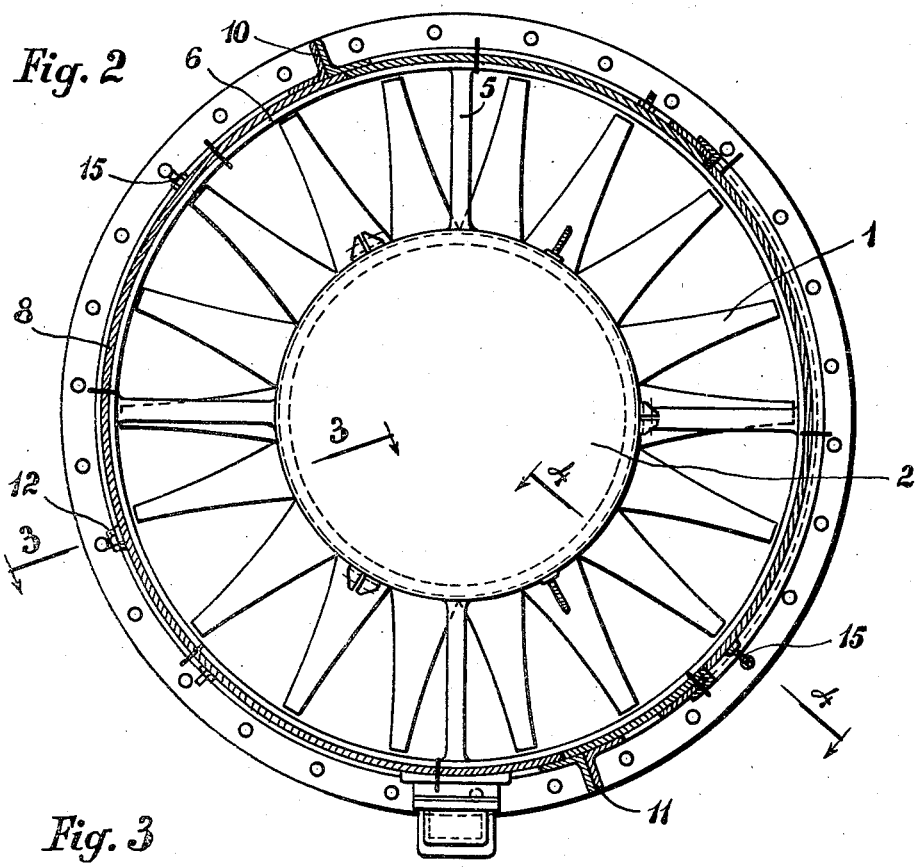
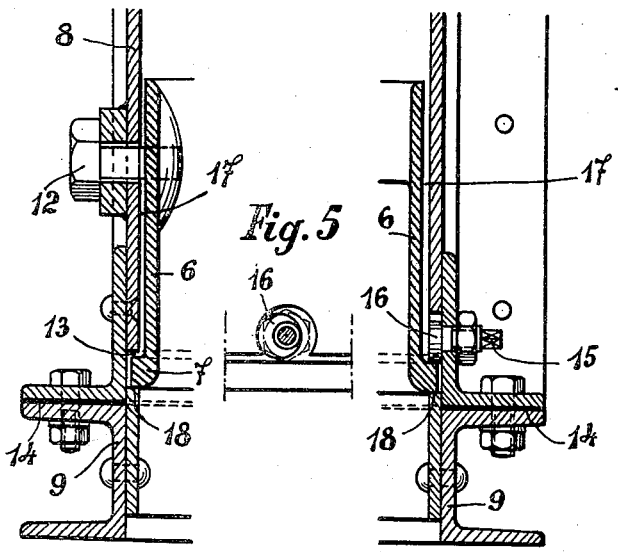
R. de Mey
Inventor
By Glascock Downing & Seebold
Attys.

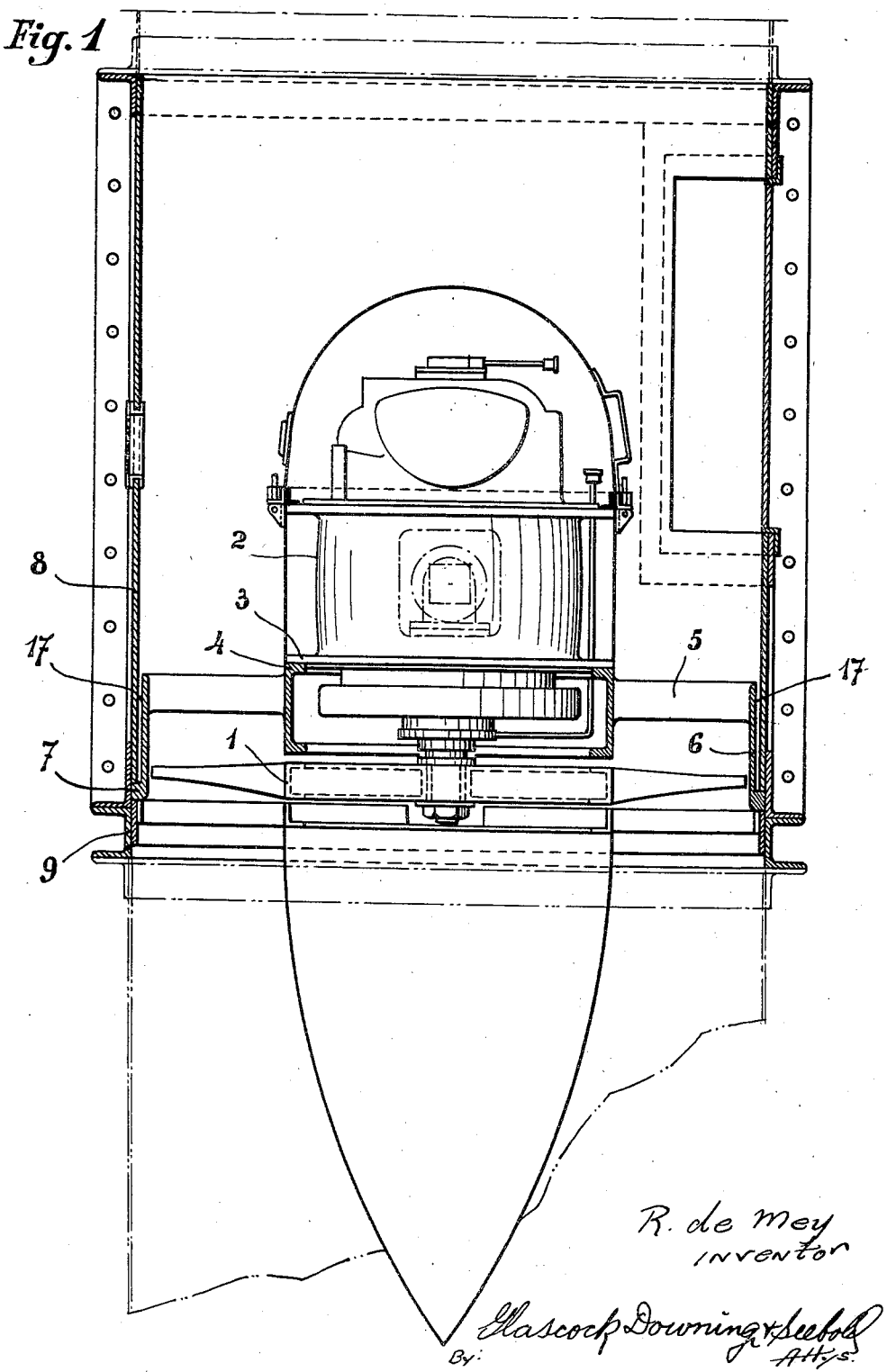

Patented Nov. 30, 1937

2,100,946

UNITED STATES PATENT OFFICE 2,100,946

SUSPENSION ARRANGEMENT FOR SCREW FAN ROTORS

René De Mey, Brussels, Belgium

Application August 2, 1935, Serial No. 34,433
In Great Britain August 7, 1934

12 Claims. (Cl. 230—273)

The object of this invention is to obviate certain drawbacks of the methods of suspension of the driving shaft which may be a prime mover or the motor and rotor assembly in the envelopes of screw type fans where such envelopes are liable to distortion due to large external forces or great heat or are formed by the walls of existing ductwork of insufficient circularity in which the driving shaft or the motor and rotor assembly are placed.

With the known suspension arrangements of the driving shaft housing or motor and rotor assembly in the envelopes of screw type fans, the continuity of the good alignment of the rotating parts and the maintenance of the uniform clearance between the tips of the rotor blades and that part of the envelope in which the rotor turns entirely depends on the envelope being made sufficiently strong and rigid to remain free from distortion and circular, no matter how great the external forces may be and whether due to constant load, sudden shock, change of temperature or great heat.

In view of the difficulty and costs of ensuring that the envelope, or ductwork in which the driving shaft or motor and rotor assembly is suspended will be free from all distortion due to the external forces it may have to support and to avoid same in accordance with the present invention the driving shaft bearing housing or motor and rotor assembly is suspended in a short casing or rotor running ring of sufficient length to enclose the rotor, which casing or ring is itself independent of the envelope, that is to say is made so that a gap remains between the envelope and the casing and freely supported but prevented from turning inside the envelope proper, or the ductwork forming the envelope, of the screw fan.

In this way any distortion of, or strains in, the envelope proper or ductwork of the screw fan can in no way affect the alignment of the driving shaft or motor and rotor assembly with the free inner casing or ring in which the rotor rotates, so that uniform spaces between the rotor blade tips and the bore of the ring can always be maintained, enabling the use of very small working clearances, with perfect freedom from breakdown on account of fouling of the rotor in the casing.

Also this suspension arrangement inside a free inner casing or ring is of particular advantage when a screw type fan is to be mounted inside an existing pipe or duct which is not perfectly circular, the complete unit comprising the driving shaft arrangement or motor and the fan rotor as well as the inner casing or ring in which the aforesaid parts are suspended, being then threaded into the existing pipe or duct forming the envelope, and suitable stops fixed to the pipe or duct being arranged to support the inner casing or ring and prevent the air or gas passing through the fan rotor from being by-passed back again between the exterior of the said inner casing or ring and the interior of the existing pipe or duct, that is through the gap between these parts.

The driving shaft or motor and rotor assembly may be suspended within the free inner casing or ring according to either of the methods already indicated under (1) (2) or (3), although this latter method (3) is to be preferred where a fine working clearance is required between the rotor blade tips and the bore of the inner casing or ring, the complete arrangement of suspension together with the inner casing or rotor running ring being hereafter called a "floating spider support".

The invention will now be described in reference to the accompanying drawings, in which:

Figs. 1 and 2 represent a sectional elevation and a top plan view respectively;

Figs. 3 and 4 are enlarged part sectional views along 3—3 and 4—4 of Fig. 2 showing the method of supporting and securing the "floating spider support" of a vertical type of a screw marine ventilating fan.

Fig. 5 shows a detail.

As will be seen in Fig. 1, the fan rotor (1) is secured onto the shaft extension of the driving motor (2), supported at its lower end through a circular flange (3), registering with and bolted to the inner central ring (4) of a "floating spider support" (5). The rotor running ring (6) of the "floating spider support" (5) is supported by means of a small flange (7), provided around its lower portion and serving also as a reinforcement for said ring, the flange (7) being arranged within a recess formed between the upper part (8) and the lower part (9) of the fan envelope. The flange (7) is supported on and overlaps more or less a shoulder (18) of this part (9). As more clearly illustrated in the enlarged detail views 3 and 4, a clearance or gap (17) is provided between the exterior of ring (6) and the interior of the envelope (8) so that the former is to some extent free in the latter thus permitting some distortion of the envelope (8) without detrimental influence on the circularity of the ring (6).

The upper part of the fan envelope (8) is made up by halves provided with vertical flanged joints (10) and (11), (Fig. 2), to enable the complete inner fan unit (driving motor (2), "floating spider support" (5) and fan rotor (1)) to be inserted in or removed from the envelope without disturbing the ductwork in which the fan is mounted. The fan unit is prevented from turning relative to the envelope (8) by means of one or more locating bolts (12) arranged as shown in Figs. 2 and 3.

As illustrated in Fig. 3 a small clearance (13) greater than the thickness of the joint (14) is provided between the underside of the upper part of the envelope (8) and the topside of the flange (7) in order to avoid any gripping action of the upper part of the envelope (8) on the flange (7) when said part has to support a large internal load and the joint (14) becomes crushed.

However, to prevent swinging movements of the inner fan unit relatively to the fan envelope each time the ship sways, with consequent harmful results to the cable connections of the driving motor (2), three, four or more friction bolts (15) (see Fig. 4) are provided, these bolts being preferably equally spaced around the lower portion of the upper half envelope (8), and provided with cam shaped heads (16), Figs. 4 and 5, adapted to press on the topside of the flange (7) of the "floating spider support". These bolts (15) are tightened upon the flange (7) upon replacement of the half envelopes (8) and owing to the eccentricity of their heads (16) a rotational movement thereof will take place with a consequent slight freeing of the bolt (15) in the event of great forces being brought to bear on them, thus preventing the "floating spider support" (5) from becoming fast upon the joint (14) being crushed.

It is to be understood that the expression "screw fan rotors" as used in the present specification and in the appended claims includes the driving shaft of the rotor which may also be a prime mover, as well as the motor and rotor assembly.

I claim:

1. A floating mounting of screw fan rotors within an encircling envelope comprising a casing to which the screw fan rotor is secured, said casing inserted within the envelope with a substantially continuous gap between these parts, rigid overlapping means for freely but positively supporting the casing on the envelope, means to prevent relative rotating movements of the casing within the envelope, means for covering the gap and means for securing the casing in the supported position.

2. A floating mounting of screw fan rotors within an encircling envelope, comprising a casing to which the screw fan rotor is secured, said casing inserted within the envelope with a substantially continuous gap between these parts, a rigid outwardly extending projection on the casing, rigid supporting means on the envelope for and overlapped by said projection and means for securing the casing in the supported position.

3. A floating mounting of screw fan rotors within an encircling envelope, comprising a casing to which the screw fan rotor is secured, said casing inserted within the envelope with a substantially continuous gap between these parts, rigid outwardly extending projections on the casing, rigid supporting means on the envelope for said projections, said projections and supporting means in direct overlapping engagement with each other and yieldable means for securing the casing in the supported position.

4. A floating mounting of screw fan rotors within an encircling envelope, comprising a casing to which the screw fan rotor is secured, said casing inserted within the envelope with a substantially continuous gap between these parts, an outwardly extending flange on the casing, said flange extending past the said gap, rigid supporting means on the envelope for directly supporting said flange, said flange and supporting means having a loose radial fit and spaced yieldable means pressing said flange on said supporting means.

5. A floating mounting of screw fan rotors within an envelope comprising a casing to which the screw fan rotor is secured, said casing inserted within the envelope with a substantially continuous gap between these parts, means for freely supporting the casing on the envelope, means to prevent the relative rotating movements of the casing within the envelope, means for covering the gap, means for freely supporting the casing within the envelope, means for securing the casing in the supported position and said latter means in the form of spaced bolts with cam shaped heads.

6. A floating mounting of screw fan rotors within an encircling envelope comprising a casing to which the screw fan rotor is secured, said casing formed of several assembled parts and inserted within the envelope with a substantially continuous gap between the envelope and the casing, means to prevent the relative rotating movement of the casing within the envelope, means for covering the gap, rigid cooperating means in direct overlapping engagement with each other for freely supporting the casing within the envelope, and means for securing the casing in the supported position.

7. A floating mounting of screw fan rotors within an encircling envelope comprising a casing of substantially circular cross section to which the screw fan rotor is secured, said casing inserted within said envelope with a substantially continuous gap between these parts, rigid cooperating means relatively movable in crosswise direction for supporting the casing on the envelope, and means for securing the casing in the supported position against axial displacement.

8. A floating mounting of screw fan rotors within an encircling envelope comprising a casing of substantially circular cross section to which the screw fan rotor is secured, said casing inserted within the said envelope with a substantially continuous gap between these parts, rigid means on the casing and the envelope directly cooperating with each other for supporting the casing on the envelope, said means providing for a loose fit in an axial direction of the casing within the envelope and means for preventing axial relative displacement of the casing and the envelope.

9. A floating mounting for screw fan rotors within an encircling envelope, comprising a casing to which the screw fan rotor is secured, said casing inserted within the envelope with a substantially continuous gap between these parts, rigid radially extending members on the casing, radially extending housings in the envelope to accommodate the said radially extending members with loose radial and axial fits between these parts and means for securing the radially extending members against axial movement within the said housing.

10. A floating mounting for screw fan rotors within an encircling envelope, comprising a casing to which the screw fan rotor is secured, said casing inserted within the envelope with a substantially continuous gap between these parts, an integral outwardly extending flange on the casing, said flange extending past the said gap, rigid supporting means for said flange on the envelope and said flange overlapping said supporting means with a loose radial fit between the flange and the opposite portion of the envelope, and means for securing said flange against axial movement relative to the said supporting means.

11. A floating mounting for screw fan rotors within an encircling envelope comprising a casing to which the screw fan rotor is secured, said casing inserted within the envelope with a substantially continuous gap between these parts, an integral outwardly extending flange on the casing, said flange extending past said gap, a circular groove in the envelope to accommodate said flange with loose radial and axial fits between these parts and means for securing the flange against axial movement within said groove.

12. A floating mounting for screw fan rotors with an encircling envelope comprising a casing to which the screw fan rotor is secured, said casing inserted within the envelope with a substantially continuous gap between these parts, rigid means on the casing and the envelope directly cooperating with each other for supporting the casing on the envelope, said means providing for a loose fit in an axial direction of the casing within the envelope, means for preventing axial relative displacement of the casing and the envelope and means for covering the gap between said casing and said envelope.

RENÉ DE MEY.